US012118202B2

(12) United States Patent
Patnaik

(10) Patent No.: US 12,118,202 B2
(45) Date of Patent: Oct. 15, 2024

(54) LOCALLY GENERATING PRELIMINARY INKING IMAGERY

(71) Applicant: Microsoft Technology Licensing, LLC, Redmond, WA (US)

(72) Inventor: Sandeep Patnaik, Kirkland, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 207 days.

(21) Appl. No.: 17/933,233

(22) Filed: Sep. 19, 2022

(65) Prior Publication Data

US 2024/0094896 A1 Mar. 21, 2024

(51) Int. Cl.
*G06F 3/04883* (2022.01)
*G06F 3/0354* (2013.01)
*G06F 9/451* (2018.01)
*G06T 11/20* (2006.01)
*H04L 67/2869* (2022.01)

(52) U.S. Cl.
CPC .......... *G06F 3/04883* (2013.01); *G06F 9/452* (2018.02); *G06T 11/203* (2013.01); *H04L 67/2869* (2022.05); *G06F 3/03545* (2013.01); *G06T 2200/24* (2013.01)

(58) Field of Classification Search
None
See application file for complete search history.

(56) References Cited

U.S. PATENT DOCUMENTS

| | | | |
|---|---|---|---|
| 9,753,741 B2 | 9/2017 | Durojaiye et al. | |
| 9,898,841 B2 | 2/2018 | Tu et al. | |
| 10,911,573 B2 | 2/2021 | Arakeri et al. | |
| 11,170,579 B2 | 11/2021 | Frommhold | |
| 2007/0153300 A1 | 7/2007 | Dodge | |
| 2015/0116226 A1 | 4/2015 | Goins | |
| 2015/0371417 A1* | 12/2015 | Angelov | G06Q 10/101 345/442 |
| 2016/0149976 A1* | 5/2016 | Emori | H04L 65/1083 709/205 |
| 2016/0379385 A1* | 12/2016 | Tu | G06F 3/1454 345/441 |
| 2018/0129366 A1* | 5/2018 | Simmons | G06F 3/04845 |
| 2018/0129367 A1 | 5/2018 | Hatfield | |
| 2023/0394721 A1* | 12/2023 | Kadowaki | G06F 3/04883 |
| 2024/0153298 A1* | 5/2024 | Fang | G06V 30/19173 |

OTHER PUBLICATIONS

"Desktop Window Manager", Retrieved from: https://docs.microsoft.com/en-us/windows/win32/dwm/dwm-overview, Aug. 24, 2019, 1 Page.

(Continued)

*Primary Examiner* — Jeffrey J Chow
(74) *Attorney, Agent, or Firm* — Alleman Hall & Tuttle LLP

(57) ABSTRACT

A method for rendering digital inking is presented. The method comprises receiving inking input at a local application window, and locally processing the received inking input to generate preliminary inking imagery for presentation in the local application window. Parameters of the received inking input are uploaded to a remote client for remote processing to generate finalized inking imagery. The preliminary inking imagery is updated based on the finalized inking imagery.

20 Claims, 11 Drawing Sheets

(56) References Cited

OTHER PUBLICATIONS

"Windows 10 Anniversary Update—More on Inking with Wet Ink & Custom Rulers", Retrieved from: https://mtaulty.com/2016/06/21/windows-10-anniversary-update-more-on-inking-with-wet-ink/, Jun. 21, 2016, 09 Pages.
Belanger, David, "Introducing pen remoting for Windows 10 and Windows Server 2016", Retrieved From: https://techcommunity.microsoft.com/t5/security-compliance-and-identity/introducing-pen-remoting-for-windows-10-and-windows-server-2016/ba-p/249299, Jul. 22, 2015, 4 Pages.
Callaham, John, "Microsoft improves pen support in Windows 10's Remote Desktop", Retrieved from: https://www.windowscentral.com/microsoft-improves-working-pen-windows-10s-remote desktop, Jul. 23, 2015, 7 Pages.
Hollasch, et al., "Features added in prior WDDM 2.X versions", Retrieved from: https://docs.microsoft.com/en-us/windows-hardware/drivers/display/what-s-new-for-prior-wddm-2-x-versions, Dec. 15, 2021, 7 Pages.
Rodriguez, Rick, "Pen remoting' turns Surface Pro into 'Cintiq-lite", Retrieved from: https://www.surfaceproartist.com/blog/2016/10/13/pen-remoting-turns-surface-pro-into-cintiq-lite, Oct. 13, 2016, 13 Pages.
Weins, Connor, "Digital Ink—Ink Interaction in Windows 10", Retrieved from: https://docs.microsoft.com/en-us/archive/msdn-magazine/2015/windows-10-special-issue/digital-ink-ink-interaction-in-windows-10, Oct. 21, 2015, 10 Pages.
White, et al., "DirectComposition", Retrieved from: https://docs.microsoft.com/en-us/windows/win32/directcomp/directcomposition-portal, Aug. 24, 2019, 2 Pages.
International Search Report and Written Opinion received for PCT Application No. PCT/US23/027860, Nov. 10, 2023, 17 pages.

\* cited by examiner

LOCALLY GENERATING PRELIMINARY INKING IMAGERY

BACKGROUND

User input mimicking strokes of a drawing instrument may be rendered by a computing device as digital ink presented on a display. Inking input may be provided by interacting with a touch sensor (e.g., a touch pad or a touch display) with a finger or digital stylus. In other examples, inking input may be provided by a pointing device, such as a joystick or a mouse. By processing the inking input with a remote or cloud server, the final, displayed digital ink may be rendered to approximate any number of combinations of media, surface, and drawing instrument.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

Remote processing of digital inking may be marked by latency. Users anticipating immediate feedback may instead find the display visuals lagging behind by centimeters or more. Herein, technologies are presented which enable like-local latency with remote processing of digital ink inputs. In one example, a method for rendering digital inking is presented. The method comprises receiving inking input at a local application window, and locally processing the received inking input to generate preliminary inking imagery for presentation in the local application window. Parameters of the received inking input are uploaded to a remote client for remote processing to generate finalized inking imagery. The preliminary inking imagery is updated based on the finalized inking imagery.

DETAILED DESCRIPTION

Digital inking may be utilized for a variety of applications, allowing users to mark-up documents, draw, handwrite, paint, or otherwise simulate the act of physical media (e.g., paper) interaction on a digital surface. Inking, as used herein, is a collective term that does not necessarily refer to simulated pen-on-paper writing. Inking parameters may be generated for different simulated drawing devices, such as pens, pencils, paintbrushes, knives, needles, fingers, crayons, chalk, etc., with different ink, paint, or other media parameters. Different inking surfaces may be simulated having different textures, such as paper, canvas, chalkboard, wood, concrete, acrylic, skin, etc. The same input may have different drying or curing curves based on the inking surface. For example, watercolor paint may spread into a paper surface, whereas pencil may remain relatively static on the same surface. Further, additional brush strokes over the same pixels may have additive properties for some media combinations but not for others. To allow users access to a wide range of inking characteristics without local storage and processing of all possible parameters, remote processing may be performed at a remote client to render the finalized graphics.

Figure 1:
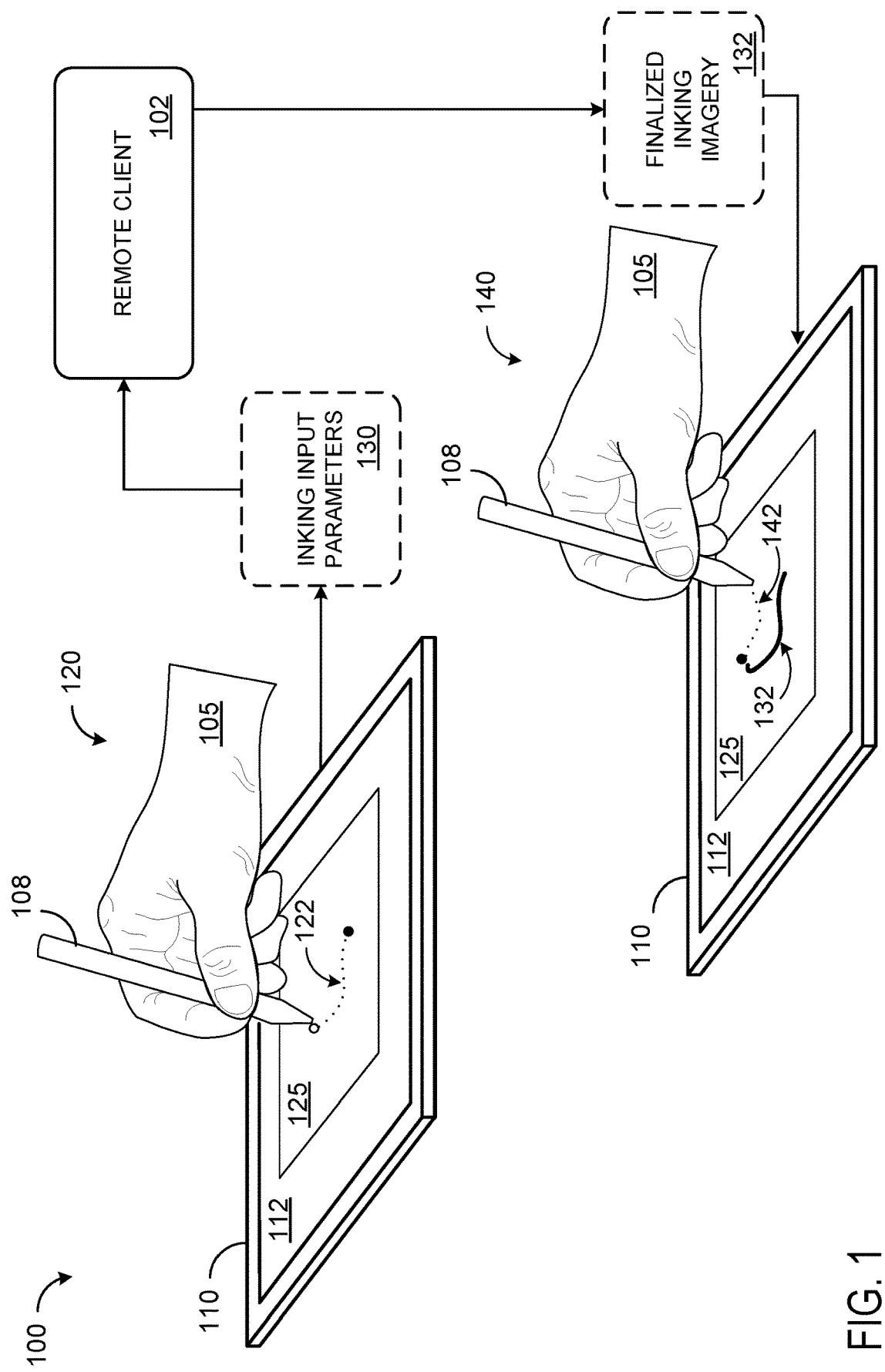
FIG. 1 shows an example scenario for rendering digital ink via a remote client.

FIG. 1 shows an example scenario 100 for rendering digital ink via a remote client 102. In this example, a user 105 employs a stylus 108 for generating digital inking at a touch-sensitive computing device 110. Touch-sensitive computing device 110 includes a touch-sensitive display 112 configured to present one or more applications. In some examples, the application itself may be a remote application (e.g., a cloud-based application).

At 120, a user is providing an initial inking input 122. Inking input 122, provided in this example by stylus 108, is captured on the endpoints of each brush stroke. Endpoints for inking input 122 are shown as a closed circle (stylus down) and an open circle (stylus up). User 105 drags stylus 108 across touch-sensitive display 112 over an active window 125 for an application configured for digital inking.

Inking input parameters 130 (e.g. (x,y) position within the active window, tilt, pressure, rotation) for each brush stroke are captured at touch-sensitive computing device 110. When configured for remote processing, inking input parameters 130 are sent over a network and are injected to the remote client 102. Inking imagery 132 is rendered at remote client 102 based on input parameters 130 and selected brush parameters (ink characteristics, surface characteristics, brush characteristics). Inking imagery 132 is then returned to touch-sensitive display 112.

At 140, active window 125 is shown updated to include inking imagery 132 for initial inking input 122. User 105 has continued to provide secondary inking input 142, parameters of which will eventually be sent to remote client 102 for rendering so that user 105 views the finalized inking imagery rendered locally. However, the by using a remote client or cloud server for processing the inking graphics, ink latency is introduced. As shown at 140, user 105 may be several centimeters and/or multiple brush strokes ahead of inking imagery 132.

Ink latency may be considered the time elapsed between a pen-down event and when ink appears on the local display device. For computing environments with high or variable network latency, end-to-end ink latency can be substantial, rendering the inking experience mentally straining or impractical. More advanced graphic users expect and may demand like-local feedback with minimal latency to mimic physical inking. Otherwise, the user may be left constantly adjusting both their pen stroke and their mental focus to make sure their input is received and processed as desired.

Generally, inking is rendered across multiple stages. In a preliminary stage (e.g., super wet ink), predicted inking segments are rendered by the system based on traced points that are fast-tracked from the input stack to the compositor. An intermediate stage (e.g., wet ink) comprises Bezier curves that are rendered while the input device is down at a slower pace than for the preliminary stage. A final stage (e.g., dry ink) occurs after the brush stroke is finished, and after the intermediate stage is finalized, baking the ink to the render target.

To address this, systems and methods are presented herein for rendering digital inking by generating preliminary inking imagery locally, so that it may be presented in a local application window with limited latency. At the same time, the input parameters are uploaded to a remote client to generate finalized inking imagery. The preliminary inking imagery is then updated and/or replaced by the finalized imagery. The local and remote devices may synchronize inking parameters so that the preliminary inking imagery bears some resemblance to the finalized imagery, and so that the user perceives a more natural drying process.

Effectively the methods and system herein enable the local rendering of digital ink in a client local desktop application based on drawing parameter values of a server content creation application hosted in a remote server virtual desktop application without the latency this would normally incur. This allows the user to perceive like-local visual feedback while the full-rendering process takes place over a remote server.

By performing the preliminary stage of rendering locally, inking latency can in some examples be reduced from 150 to over 300 milliseconds down to a latency on the order of 25 milliseconds. Further, this modest latency period is unaffected by variable network latency that may otherwise cause fluctuations in initial rendering. This solution is portable and extensible to allow for adaptation to a broad range of applications using an appropriate application programming interface (API) or plug-in.

Figure 2:
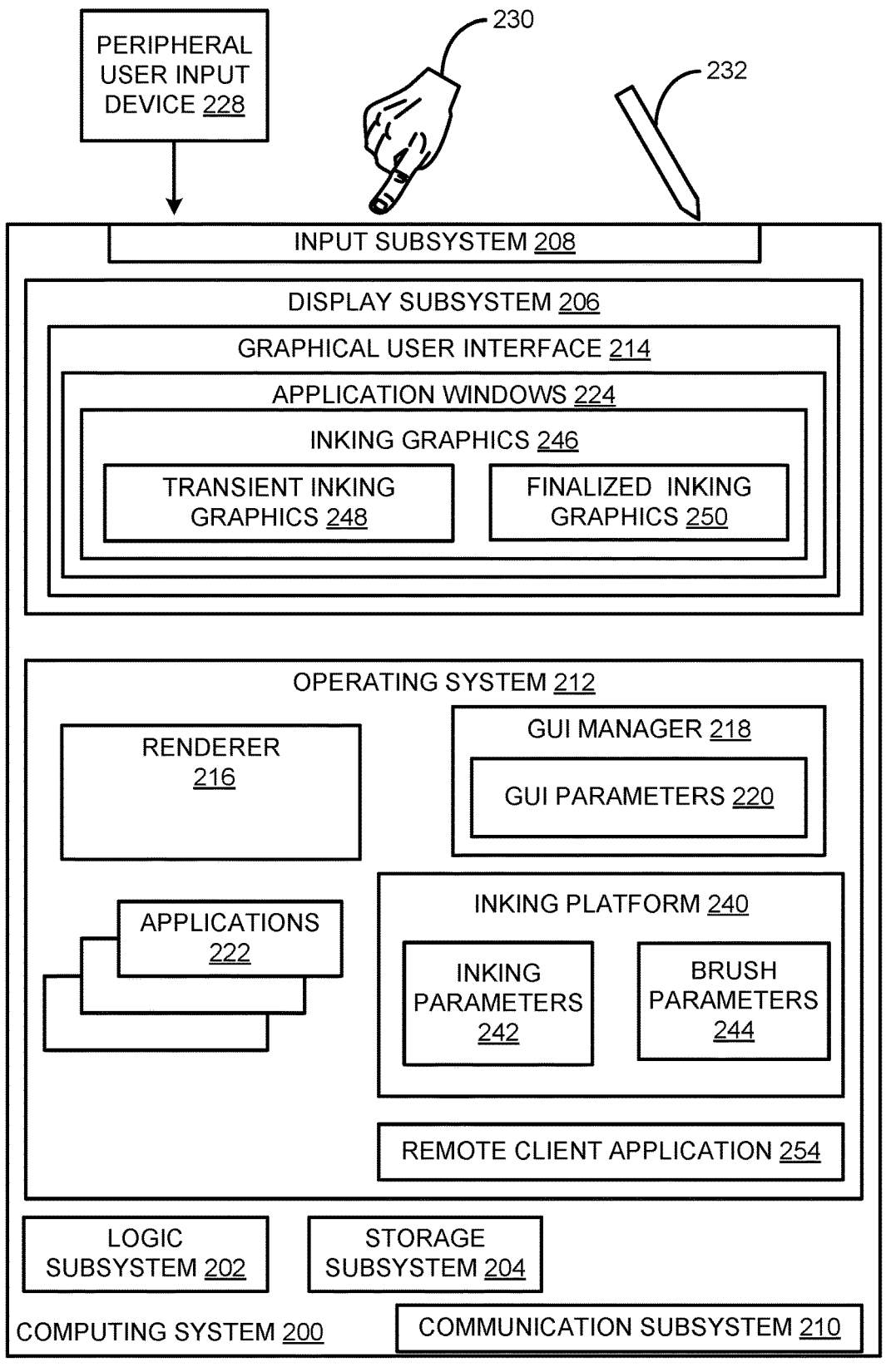
FIG. 2 schematically shows an example device for rendering digital inking.

FIG. 2 shows an example computing system 200 in simplified form. The computing system 200 may take the form of one or more personal computers, tablet computers, home-entertainment computers, augmented or virtual reality computers, network computing devices, gaming devices, mobile computing devices, mobile communication devices (e.g., smart phone), and/or other computing devices.

Computing system 200 includes a logic subsystem 202, and a storage subsystem 204. Logic subsystem 202 includes one or more logic machines, e.g., processors. Storage subsystem 204 includes one or more storage machines. Storage machines may include volatile memory, such as a cache, and non-volatile memory, such as a hard drive. Computing system 200 further includes a display subsystem 206, an input subsystem 208, and a communication subsystem 210. Examples of these components are presented further herein and with regard to FIG. 11.

Operating system 212 is configured to manage operation of hardware and software resources of the computing system 200. For example, operating system 212 may schedule tasks for allocation of processor resources, storage resources, and other resources of the computing system 200. Display subsystem 206 is configured to visually present a graphical user interface (GUI) 214.

Operating system 212 includes at least one or more renderers 216 and a GUI manager 218. One or more renderers 216 may be configured to composite an image representing the graphical user interface 214 and to send the image to the display subsystem 206 for visual presentation. The one or more renderers 216 may perform any suitable processing to render the image of the graphical user interface 214. Non-limiting example processing operations may include blending, fading, scaling, and other 2D and 3D animation effects. GUI manager 218 may manage GUI 214 based on one or more GUI parameters 220.

Operating system 212 may enact and act as an intermediary for a plurality of applications 222; Applications 222 may be stored locally in storage subsystem 204, or remotely. Applications 222 may be executed by computing system 200 to perform various functions via hardware of computing system 200. The plurality of applications 116 may include any suitable type of application. Although the plurality of applications 222 will be discussed in the context of obtaining, rendering, and presenting inking graphics, the plurality of applications 222 may provide any suitable functionality. For example, application 222 may include applications for professional graphic design and illustration, casual creativity (e.g., drawing and painting) applications, word processing applications, note taking applications, document collaboration and annotation applications, information presentation applications, photo-editing applications, mapping and direction applications, etc.

Graphical user interface 214 may be divided into any suitable number of different areas, having any suitable dimensions. In some cases, different areas may include application windows 224 associated with different applications 222. Each application window 224 may define a portion of display subsystem 206 where the graphics for the relevant application 222 are presented on display subsystem 206, and where input to computing system 200 via input subsystem 208 is assigned to the application.

User input may be provided to computing system 200 via input subsystem 208. In one example, user input may be provided to the computing system 200 by a peripheral user input device 228, such as a mouse, joystick, game controller, etc. In some implementations, the display subsystem 206 may include a touch sensor, and user input may be provided to the computing system 200 in the form of touch input. In one example, touch input may be provided to the computing system 200 by one or more fingers 230. In another example, touch input may be provided to the computing system 200 by a stylus 232. In some examples, input subsystem 208 may include one or more cameras, microphones, or other devices configured to allow a user to provide natural input to computing system, such as gesture or speech input.

Applications 222 may be configured to interact with inking platform 240, such as via an API or a plug-in. Inking platform 240 may thus be invoked to allow user input within an application window 224 to appear as interactive drawing that relates to the underlying application 222. Inking platform 240 may use inking parameters 242 and brush parameters 244 to generate inking graphics 246. Inking parameters 242 may be generated based on user input. Inking parameters may be clustered for each brush stroke, bracketed by a pen-down event and a pen-up event, and including any pen dragging across an application window there-between.

A user may select a subset of brush parameters 244 for rendering inking graphics 246. Users may change brush parameters between inking sessions, between brush strokes, etc. If a user is inking in multiple application windows at the same time, different subsets of brush parameters may be selected for each active application window. Inking graphics 246 include transient inking graphics 248, finalized inking graphics 250, and may further include one or more levels of intermediate inking graphics. As described further herein, transient inking graphics 248 may be presented in a transient window and may be updated, deleted and/or transferred to finalized inking graphics 250 when available. Transient inking graphics 248 may be generated locally in order to provide immediate feedback to the user, while finalized inking graphics 250 may be generated locally or remotely following more time-consuming processing. Transient inking graphics 248 may be retained locally and temporarily, and only maintained so that the "ink" appears to leave the "pen" immediately as if it were happening locally. Transient inking graphics 248 may not be stored in non-volatile memory for privacy purposes. However, a modest buffer of transient inking graphics may be maintained in volatile memory in order to prevent against drops in network connectivity, or to allow for a user to return to an earlier graphic.

Finalized inking graphics 250 may be integrated into application window 224 so as to interact with any underlying graphics. The finalized inking graphics may be fixed to application window 224 so as to move, re-seize, scroll, etc. as the user manipulates application window. In some examples, finalized inking graphics may be adjusted based on the content within application window 224, so as to more accurately match graphics (e.g., fonts, filling in circles). The application 222 may then merge the finalized inking graphics with the underlying imagery. When a next update to the finalized inking graphics is brought to the local application window 224, the previous inputs may be displayed as if they've been recorded into application 222 in the permanent layer associated with the finalized inking graphics 250.

Inking platform 240 may be configured to render ink with different attributes and for different types of input. Further, in some implementations, each application of the plurality of applications 222 may be configured with a unique set of parameters or setting to integrate with inking platform 240.

Non-limiting examples of inking parameters 242 and brush parameters 244 may include a position (e.g., an ordered sequence of screen coordinates), path, joint attributes, a pressure, a color, a thickness, a tip shape (e.g., pen, brush, highlighter), a transparency, and a transformation. In one example, a single brush stroke data may include parameters that define one continuous line. For example, brush stroke created as a result of touch input may define a continuous line between a touch down event and a lift up event. In another example, brush stroke created as a result of user input via a mouse may define a continuous line between a mouse button depress event and a mouse button release event. In some implementations, inking graphics 246 may be represented by one or more Bezier curves.

Non-limiting examples of modifications brush parameters 244 include changing a color, changing a thickness, changing a path, applying a transformation, and changing a tip shape. In one particular example, ink and pen tip parameters may be modified separately. For example, a transformation can be applied to a tip shape to build special pen types. In another example, brush parameters can be modified with or without changing a stroke width/size.

In some implementations, finalized inking graphics may represent "dry" brush strokes that are created upon completion of brush stroke event, while transient inking graphics may represent "wet" or "super-wet" brush strokes. For example, brush stroke event may be completed responsive to a finger that performed the ink stroke user input being lifted from a display (or other touch sensor). In another example, brush stroke event may be completed responsive to a stylus that performed the ink stroke user input being lifted from a display (or other touch sensor). In yet another example, a brush stroke event may be completed responsive to a depressed mouse button being released. Super-wet brush strokes may in part be predicted based on the speed or direction in which the input device is moving, e.g., a few milliseconds ahead of the input device.

Remote client app 254 may communicate with remote client 256 via communication subsystem 210. Remote client 256 may remotely operate one or more applications 222, operating systems 212, inking platforms 240, and then transfer data back to computing system 200 for local presentation. Remote client app 254 and remote client 256 may be any cloud service, web-app, or virtualization solution, such as a remote or virtual desktop, which allow for off-boarding of processing power. In some examples, computing system 200 and remote client 256 may simply be two computing systems that share a local network, such as a tablet computer and a desktop computer. Remote processing by inking platform 240 may be performed in any circumstance where computing system 200 has a screen where touch or inking inputs are being perceived by the user, but the actual software that is applying those is in a latent link between its host and the display.

Figure 3:
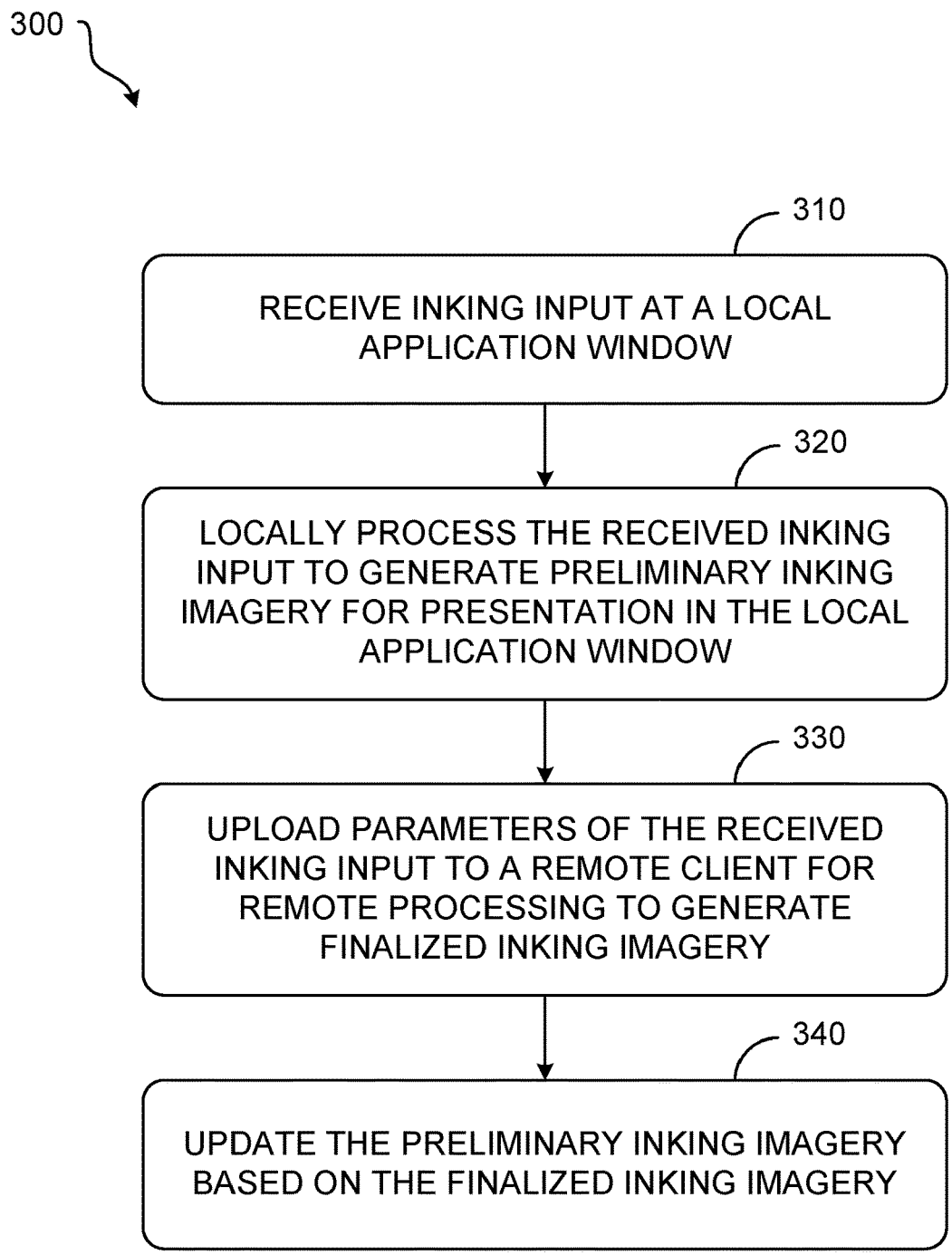
FIG. 3 shows a flow-diagram for a method of rendering digital inking.

FIG. 3 shows an example method 300 for rendering digital inking. shows a flow-diagram for another example method 500 for rendering digital inking. Method 500 may be performed by any suitable computing device operating an application configured to interact with a remote digital inking protocol, such as computing system 200.

At 310, method 300 includes receiving inking input at a local application window. For example, as shown in FIG. 2, the inking input may be provided via a touch screen using a stylus or digit or may be provided with any other suitable input device. The local application window may be configured to receive inking input and to present inking graphics for display. In some examples, the local application may be synced with a remote application via a remote client. For example, the local application may be local shell for a remotely hosted application. The local application may be a cloud-enabled application, such as a word processing application or drawing application where data input to the application is uploaded to the cloud where the actual work of processing application data is occurring. However, in other examples, the application is fully local, excepting for an API or plug-in that provides remote synchronization with an inking platform.

At 320, method 300 includes locally processing the received inking input to generate preliminary inking imagery for presentation in the local application window. For example, the received inking input may be processed locally based on a subset of brush parameters and/or other texture parameters for presentation within a local, transient window. The subset of brush parameters may be synchronized between the local application window and the remote client, for example, by downloading brush parameters from the remote client. However, in some examples, the brush parameters are stored locally, such as a default subset of brush parameters, a previously used set of brush parameters, or a subset of brush parameters provided by the local application in the event that brush parameters are unable to be extracted from the remote client. In some examples, user behavior may be learned, and common settings adjusted overtime to provide a likely to be selected subset of brush parameters for immediate use in a small footprint. In some examples, the local application may not be natively integrated with the inking platform. In some such examples, Representative transient inking graphics may be displayed to provide low-latency imagery, even in the case where the inking parameters are sent to a third-party application for processing.

At 330, method 300 includes uploading parameters of the received inking input to a remote client for remote processing to generate finalized inking imagery. While the inking parameters are uploaded, the preliminary inking imagery may not be uploaded, and rather maintained locally.

At 340, method 300 includes updating the preliminary inking imagery based on the finalized inking imagery. The finalized inking imagery may be generated at the remote client based on the uploaded parameters of the received inking input and the synchronized brush parameters. The finalized inking imagery may be considered "dry" ink. In this way, a local inking experience is created that is close to being accurate, but any small differences between the preliminary inking imagery and the finalized inking imagery is corrected to the extent that it varies.

Updating the preliminary inking imagery may include deleting the preliminary inking imagery. For example, the associated transient inking layer may be cleared from the cache. In some examples, the preliminary inking imagery may be updated in multiple updates, such as "wet" ink followed by "dry" ink. In this way, the inking platform may mimic a medium that changes over time as the ink dries or spreads into the canvas. Further, this may allow user to intervene before the brush stroke is permanently recorded as acknowledged-dry. Such updates may be adjusted based on inking parameters, brush parameters, network latency, etc.

Figure 4:
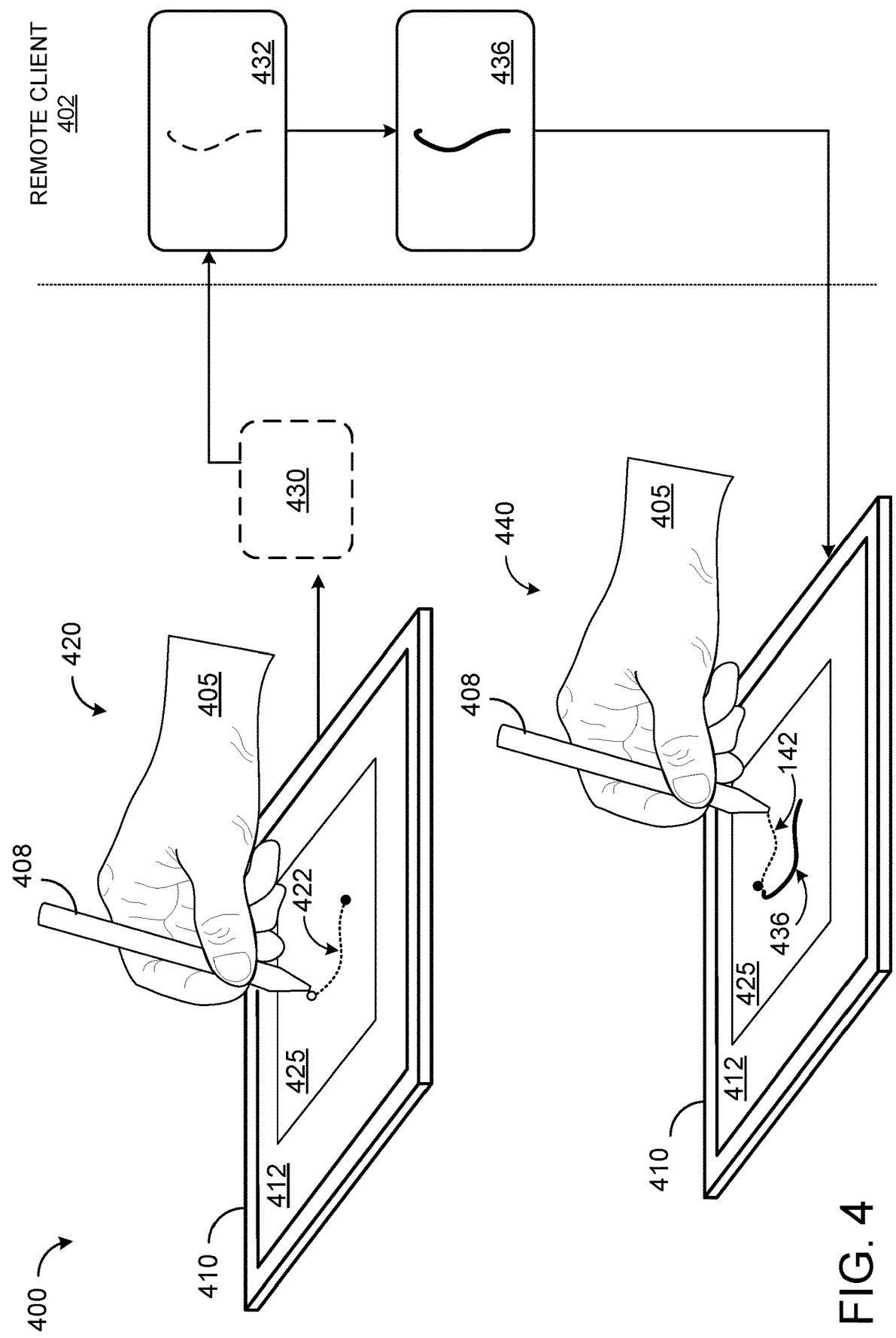
FIG. 4 shows an example scenario for locally rendering preliminary digital inking imagery and remotely rendering finalized digital inking imagery.

FIG. 4 shows an example scenario 400 for rendering digital ink via a remote client 402 according to method 300. In this example, a user 405 employs a stylus 408 for generating digital inking at a touch-sensitive computing device 410. Touch-sensitive computing device 410 includes a touch-sensitive display 412 configured to present one or more applications. In some examples, the application itself may be a remote application (e.g., a cloud-based application).

At 420, a user is providing an initial inking input 422. Inking input 422, provided in this example by stylus 408, is captured on the endpoints of each brush stroke. Endpoints for inking input 422 are shown as a closed circle (stylus down) and an open circle (stylus up). User 405 drags stylus 408 across touch-sensitive display 412 over an active window 425 for an application configured for digital inking. Inking input 422 is visualized as preliminary inking imagery, viewable by user 405 immediately following inking.

Inking input parameters 430 for each brush stroke of inking input 422 are captured at touch-sensitive computing device 410. Inking input parameters 430 associated with inking input 422 are sent over a network and are injected to the remote client 402. Intermediate inking imagery 432 is rendered at remote client 402 based on input parameters 430 and selected brush parameters. Further processing of intermediate inking imagery 432 generates finalized inking imagery 436. Finalized inking imagery 436 is then returned to touch-sensitive display 412.

At 440, active window 425 is shown so that the preliminary inking imagery is updated to be viewable as the finalized inking imagery 436 for initial inking input 422. As such, while user 405 has continued to provide secondary inking input 442, new preliminary inking imagery is viewable. While this imagery is updated as finalized inking imagery is received, the user receives continuous visual feedback, allowing for a more seamless inking experience.

Figure 5:
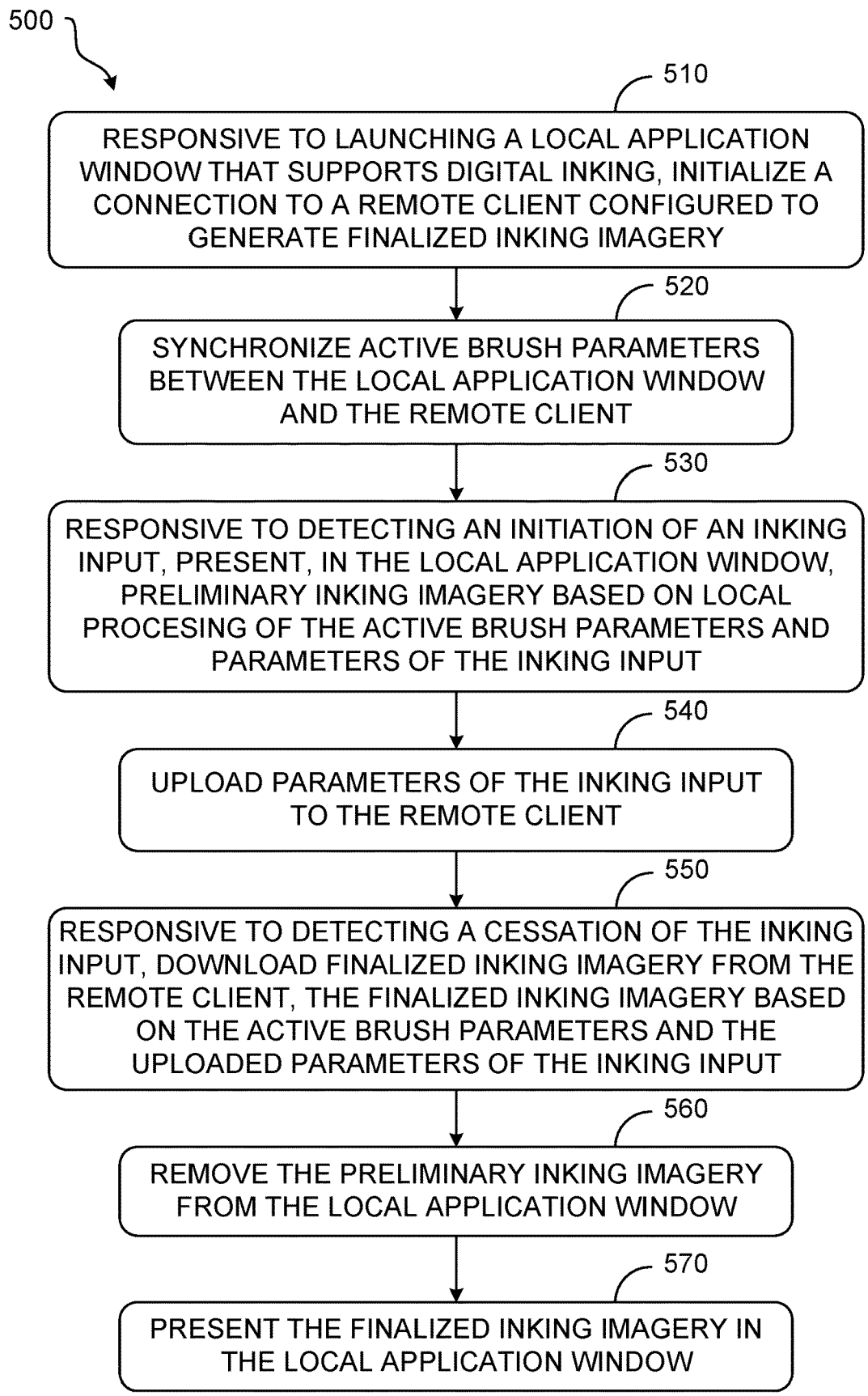
FIG. 5 shows a flow-diagram for a method of rendering digital inking.

FIG. 5 shows a flow-diagram for another example method 500 for rendering digital inking. Method 500 may be performed by any suitable computing device operating an application configured to interact with a remote digital inking protocol, such as computing system 200.

At 510, method 500 includes, responsive to launching a local application window that supports digital inking, initializing a connection to a remote client configured to generate finalized inking imagery. As described with regard to FIG. 3, in some examples, the local application is a local shell for a remotely hosted application, such as a web-based or cloud-based application. The remote client connection may be initialized by a dedicated server gateway, such as a remote desktop gateway. Once initialized, components of the local device and the remote client may establish more direct lines of communication.

As an example, FIG. 5 will be described with regards to FIGS. 6-10. FIGS. 6-10 schematically depict a system 600 for remotely generating inking graphics. System 600 includes a user input layer 602, a local computing device 604, and a remote client 606. Local computing device 604 may be an example of computing system 200. Remote client 606 may be an example of remote client 256.

User input layer 602 may include a user input mechanism, such as a peripheral user input device, a stylus, and/or a digit of the user (examples may include, e.g., peripheral user input device 228, finger 230, and stylus 232 as depicted in FIG. 2). The user input mechanism may provide input to an input subsystem of local computing device 604 (e.g., input subsystem 208).

Local computing device 604 includes local applications 610, remote client app 612, and GUI manager 614. Local applications 610 may be examples of applications 222. Remote client app 612 may be an example of remote client app 254. GUI manager 614 may be an example of GUI manager 218. Local applications 610 may be compatible with inking platform 620 and renderer 622, which may be examples of inking platform 240 and renderer 216, respectively. GUI manager 614 may comprise GUI parameters 624, which may be an example of GUI parameters 220.

In this example, local applications 610 are locally hosted versions of remote applications 630 hosted by remote client 606. A remote portal 632 is employed to handle core communication between local computing device 604 and remote client 606. Specifically, remote portal 632 may handle communications between local computing device 604 and remote applications 630, and between local computing device 604 and remote GUI manager 634.

Remote applications 630 include applications that operate on remote client 606 for processing and presentation on local computing device 604, thereby consuming fewer local resources. Remote applications 630 comprise a remote inking platform 640 configured to generate finalized inking imagery from inking parameters generated from user input layer 602. Remote applications 630 further include a remote renderer 642 that is configured to generate imagery parameters for imagery display via renderer 622. The remote renderer operates similar to local inking, when inking input parameters are received, depending on whether a GPU is operating on local computing device 604, there is an interaction between the inking input parameters and the brush parameters that happens through the kernel to the graphics layers so that the desired ink effect is calculated and prepared for presentation.

Similarly, remote GUI manager 634 comprises GUI parameters 644. GUI parameters can provide a next layer of refinement, determining gradients and colors on a pixel-bypixel basis that may adjust over time as the ink dries. Remote GUI manager may be configured to manage graphical content for display on a display of local computing device 604, effectively remotely performing operations that would otherwise be performed by GUI manager 614.

GUI sync 646 is employed to synchronize local GUI parameters 624 and remote GUI parameters 644. In this way, changes in local GUI parameters 624 and local applications 610 are communicated to remote applications 630 and remote GUI manager 634 so that remote operations and graphics rendering can be seamlessly ported to local computing device 604.

Figure 6:
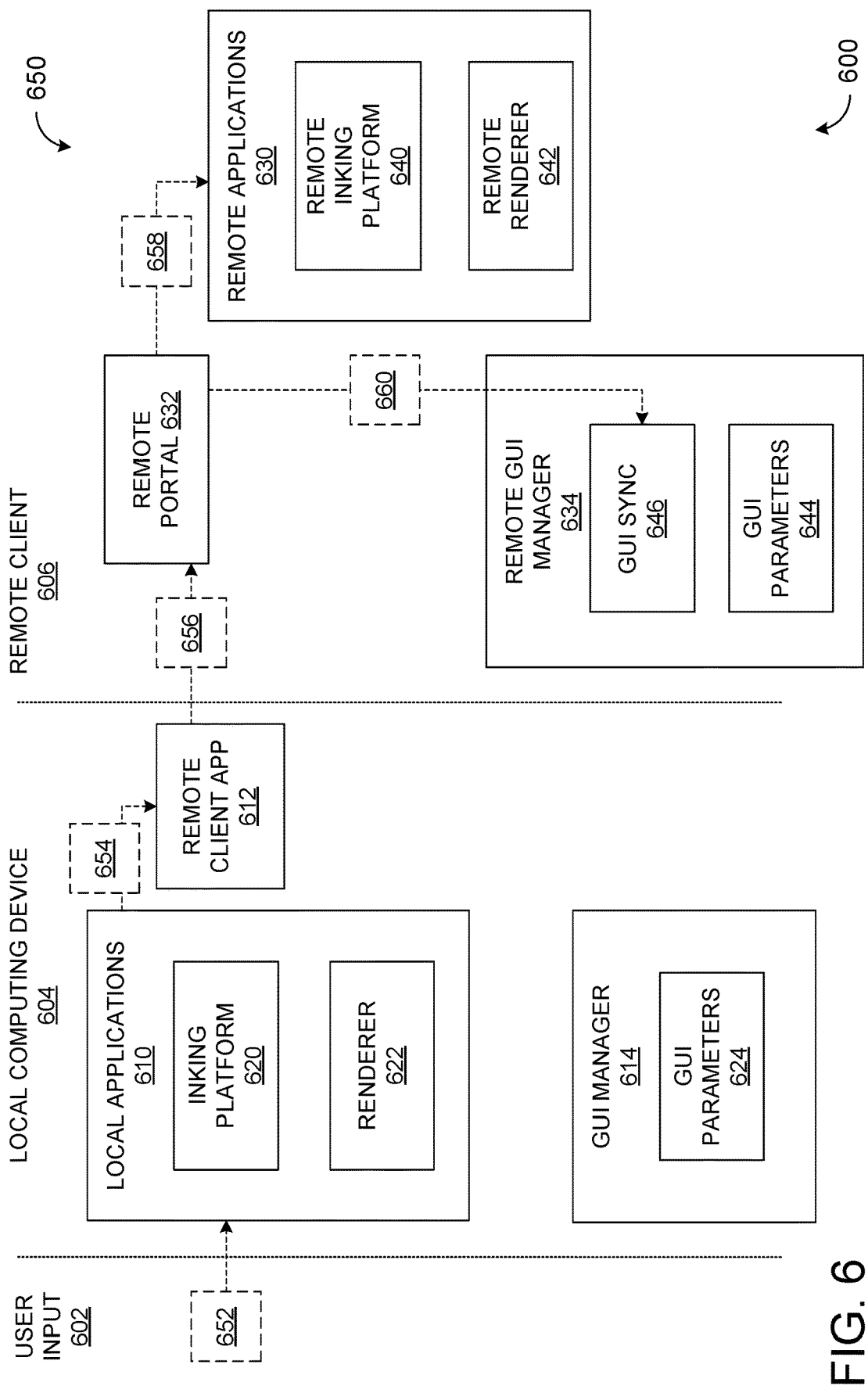
FIG. 6 schematically depicts an operation for initializing a connection to a remote client configured to generate finalized inking imagery.

For example, FIG. 6 depicts an operation 650 for initializing a connection to a remote client configured to generate finalized inking imagery. At 652, user input is provided to local computing device 604 indicating to open a local application 610 that is compatible with inking platform 620. At 654, the selected local application 610 is launched and a request to open a channel with remote GUI manager 634 is provided to remote client app 612. At 656, remote client app 612 provides a request to remote portal 632 to launch the remote version of the selected local application 610, and to open a channel with remote GUI manager 634. Remote portal 632 provides the request to launch a remote application 630 at 658 and provides the request to open a channel with remote GUI manager 634 at 660. In this configuration, the same local application 610 and remote application 630 are launched, and GUI manager 614 and remote GUI manager 634 are able to establish communications.

Returning to FIG. 5, at 520, method 500 includes synchronizing active brush parameters between the local application window and the remote client. For example, the local application window may request and receive a subset of brush parameters for a virtual drawing element (e.g., a virtual pen, brush, marker). The brush parameters may include ink color, drawing element tip width and shape, virtual surface properties (e.g., surface composition, thickness), and other properties of the brush or surface as described with regard to FIG. 2. The brush parameters may be selected for a specific content creation application, and/or for the inking platform itself. In some examples, the active brush parameters are requested in response to a detected input. In some examples, as described with regard to FIG. 2, one or more subsets of brush parameters are stored locally. Synchronizing the active brush parameters may thus include uploading the locally stored brush parameters to the remote client. For example, a default subset of brush parameters may be selected in the event that requested brush parameters are corrupted or otherwise unavailable for download.

Figure 7:
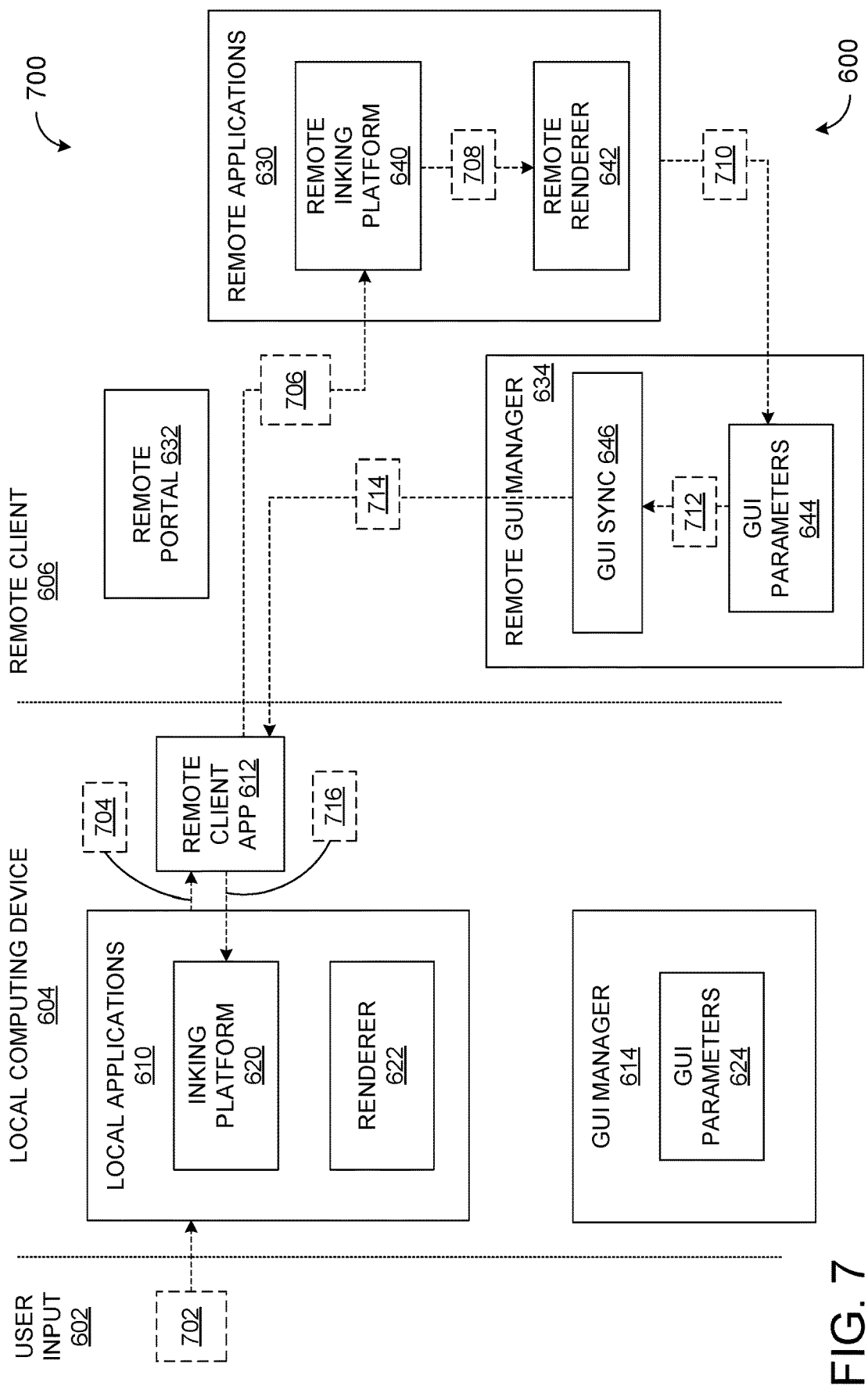
FIG. 7 schematically depicts an operation for synchronizing brush parameters between a local computing device and a remote client.

For example, FIG. 7 depicts an operation 700 for synchronizing brush parameters between local computing device 604 and remote client 606. At 702, user input is provided to select or change brush parameters. At launch of local application 610, inking platform 620 may select a default subset of brush parameters (e.g., a subset of brush parameters associated with the user input device), a subset of brush parameters previously used for inking in the launched local application 610 or may prompt the user to select a subset of brush parameters.

Subsets of brush parameters may be stored at remote client 606, rather than providing all possible subsets locally. At 704, local application 610 provides the request for a selected subset of brush parameters to remote client app 612, which, at 706, forwards the request to remote inking platform 640 via remote application 630. At 708, a subset of brush parameters is selected or generated and provided to remote renderer 642. A set of parameters are generated at remote renderer 642 and, at 710, the parameters are provided to GUI parameters 644. At 712, the updated GUI parameters are provided to GUI sync 646, and send, as an updated subset of brush parameters to remote client app 612, as shown at 714. At 716, remote client app 612 then updates the brush parameters for local application 610 and inking platform 620.

Returning to FIG. 5, at 530, method 500 includes responsive to detecting an initiation of an inking input, presenting, in the local application window, preliminary inking imagery based on local processing of the active brush parameters and parameters of the inking input.

Once the brush parameters are established locally, incoming parameters of the inking input can be processed locally to generate a preliminary inking imagery. In some examples, this preliminary inking imagery may be presented in a transient layer of the application window. If the application window only uses part of the display screen, the transient layer will be generated to coincide with the application window dimensions. As such, any inking input that strays from the application window will not be presented on the associated transient screen.

At 540, method 500 includes uploading parameters of the inking input to the remote client. As described with regard to FIG. 2, the inking input parameters may include (x,y) coordinates, pressure, angle, input device-specific parameters, velocity, etc. The (x,y) coordinates may be calculated based on the dimensions of the application window, and/or the pixel density of the application window. As such, if the user is moving between two different display screens within the same applications window, there may be two separate (x,y) coordinate systems. Parameters of inking input may be uploaded continuously, or bundled based on time, or segment, such as between a pen-down event and subsequent pen-up event.

Figure 8:
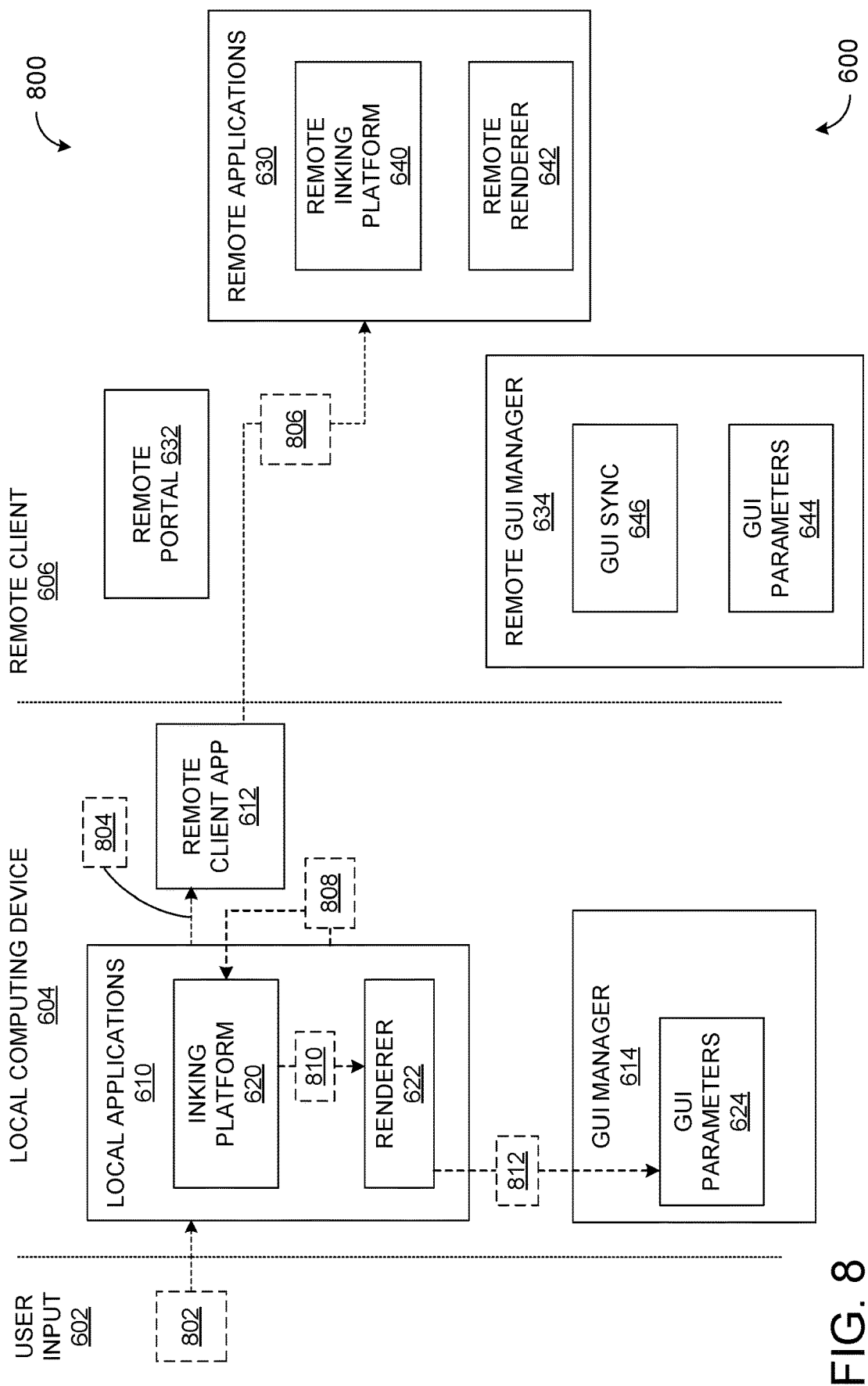
FIG. 8 schematically depicts an operation for initiating preliminary inking imagery.

For example, FIG. 8 depicts an operation 800 for initiating preliminary inking imagery. At 802, an initiation of an inking input is received from user input layer 602. For example, a pen-down event may be detected by the input subsystem of local computing device 604. At 804, the pen-down event and/or any associated inking parameters (e.g., (x,y) location, initial pressure) are provided to remote client app 612, which, at 806 forwards the pen-down event to remote application 830. In some examples, remote GUI manager 634 and GUI parameters 644 are not engaged at this point.

At 808, local application 610 provides an indication of the pen-down event to inking platform 620. At 810, inking platform 620 creates a transient layer for rendering the preliminary inking imagery. Active inking parameters are established and, at 812, used to update GUI parameters 624.

Figure 9:
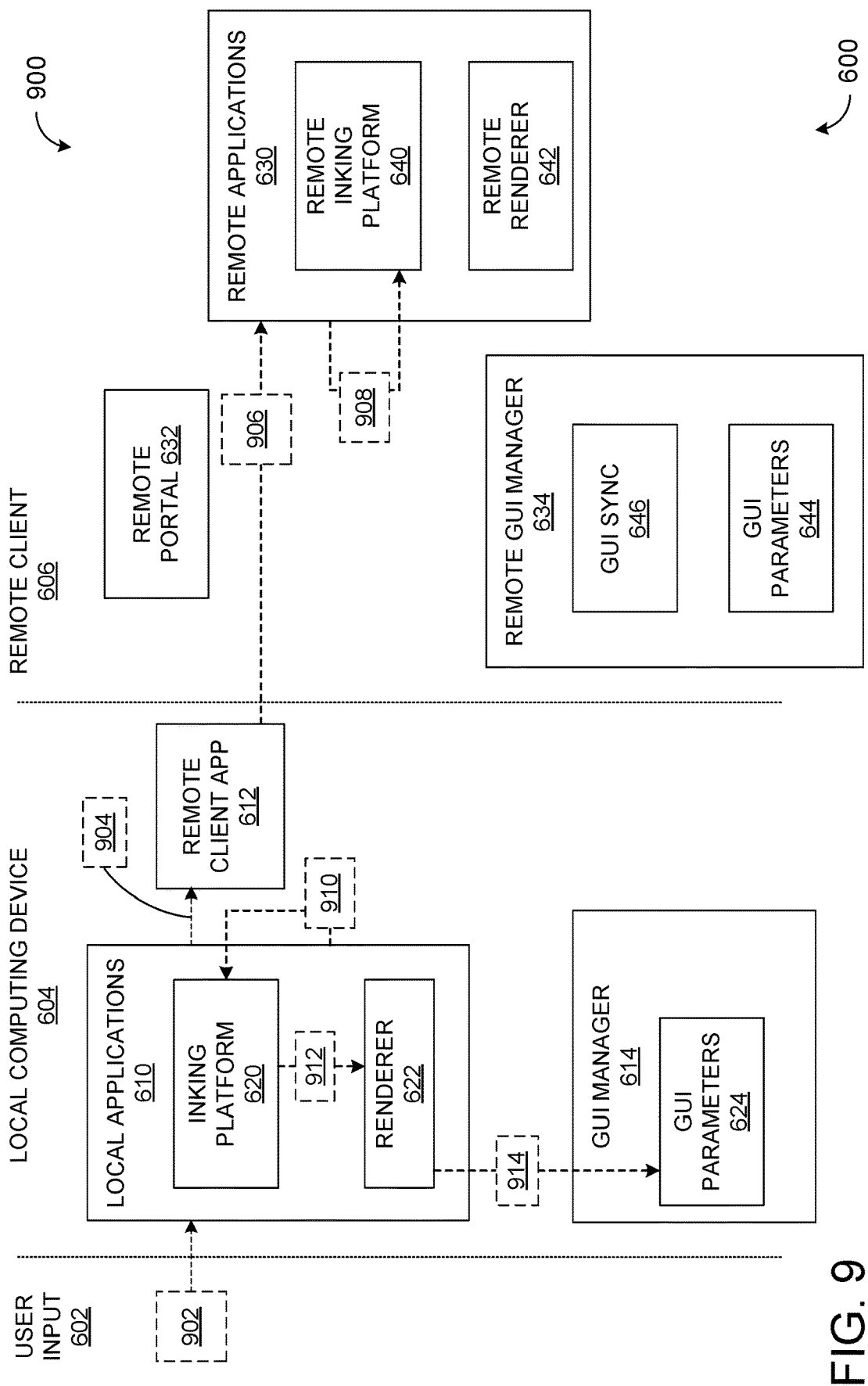
FIG. 9 schematically depicts an operation for generating preliminary inking imagery in a local application window.

FIG. 9 depicts an operation 900 for generating preliminary inking imagery in a local application window. At 902, inking input is received from user input layer 602. For example, a pen-dragging event may be detected by the input subsystem of local computing device 604, initiating a brush stroke. At 904, the pen-dragging event and/or any associated inking parameters (e.g., (x,y) location, pressure, tilt, velocity) are provided to remote client app 612, which, at 906 forwards the pen-dragging event and inking parameters to remote application 630. Remote application 630 then conveys this information to remote inking platform 640, as indicated at 908. In some examples, remote GUI manager 634 and GUI parameters 644 are not engaged at this point.

At 910, local application 610 provides an indication of the pen-dragging event to inking platform 620. At 912, inking platform 620 processes the inking parameters of the pen-dragging event and provides the inking parameters to renderer 622. At 914, the inking parameters renderer 622 translates the inking parameters and provides them to GUI parameters 624. Preliminary inking imagery can then be generated based on the inking parameters and brush parameters stored at GUI parameters 624 and presented in the transient layer.

Returning to FIG. 5, at 550, method 500 includes responsive to detecting a cessation of the inking input, downloading finalized inking imagery from the remote client, the finalized inking imagery based on the active brush parameters and the uploaded parameters of the inking input. As described with regard to FIG. 3, the finalized inking imagery may be considered "dry" ink. The finalized inking imagery for a segment or brush stroke may be downloaded as a bundle of graphic information.

Continuing at 560, method 500 includes removing the preliminary inking imagery from the local application window. For example, the transient layer where the preliminary inking imagery may be cleared or deleted. In some cases the transient layer may be cleared or deleted at once. In other cases, the transient layer may be cleared or deleted on a pixel-by-pixel bases, as the finalized inking imagery is ready for presentation, or to provide the user a more natural inking experience.

Continuing at 570, method 500 includes presenting the finalized inking imagery in the local application window. Rather than updating the whole application window, changes that appear on the screen may be encoded, such that the changes are sent to the local computing system. The local computing system then unpacks and decodes the encoded stream, replaces each pixel individually. When that update is available, the GUI presenting the local, transient imagery recognizes that the transient inking imagery is there, so the transient inking imagery is removed and replaced with the finalized inking imagery. The preliminary inking imagery may thus be present transiently for a variable amount of time that depends on when changes that are co-located to that same pixel are ready for presentation.

Figure 10:
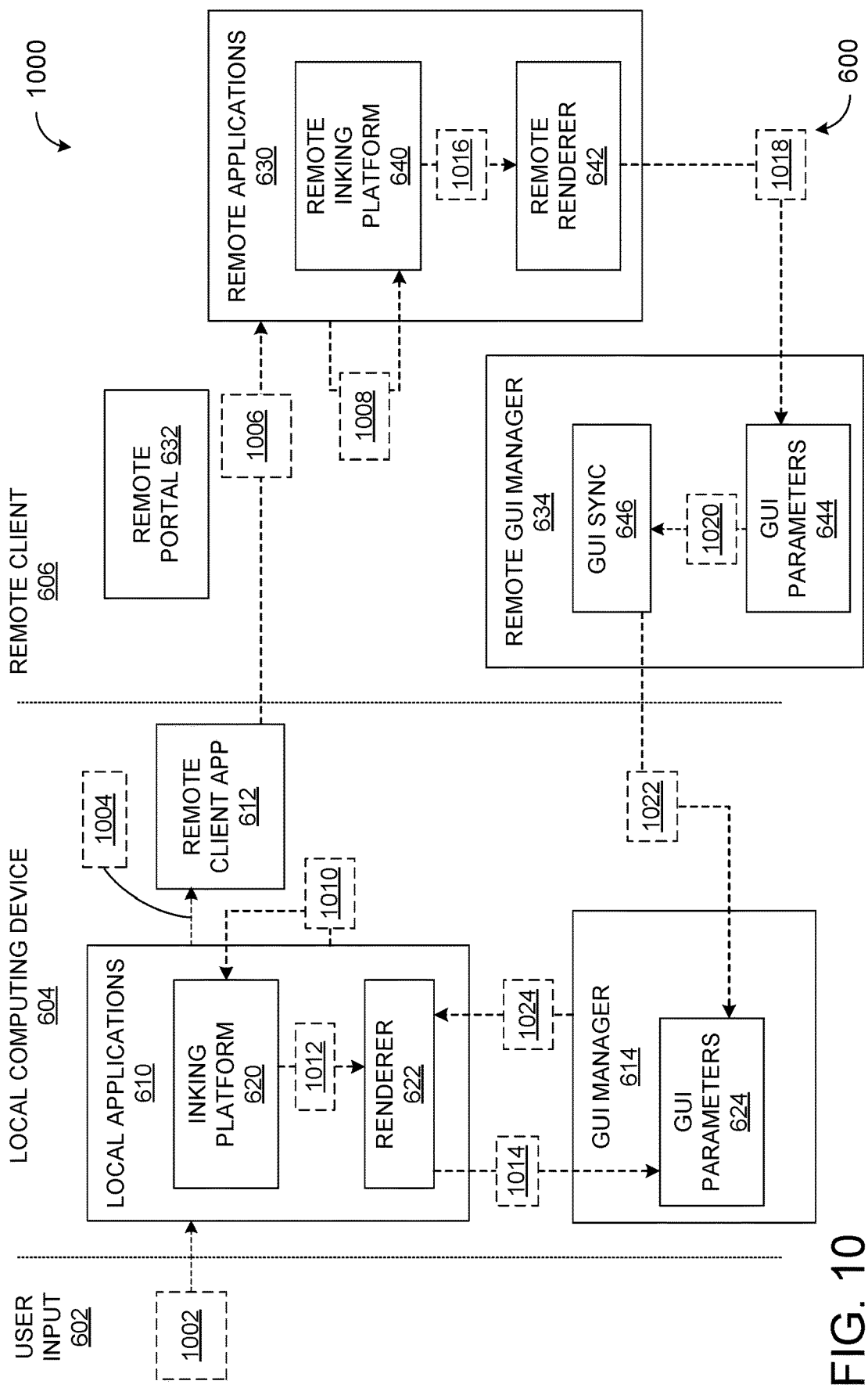
FIG. 10 schematically depicts an operation for presenting finalized inking imagery in a local application window.

FIG. 10 depicts an operation 1000 for presenting finalized inking imagery in a local application window. At 1002, a cessation of inking input is detected based on user input layer 602, such as a pen-up event.

At 1004, the pen-up event and any associated inking for the inking input or brush stroke are provided to remote client app 612, which, at 1006 forwards the pen-up event and inking parameters to remote application 630. Remote application 630 then conveys this information to remote inking platform 640, as indicated at 1008.

At 1010, the cessation of inking input is provided from local application 610 to inking platform 620. At 1012, inking platform 620 then provides an indication to renderer 622 that the inking input has ended. Renderer 622 then relays this information to GUI parameters 624, as indicated at 1014. GUI parameters may then prepare to remove the preliminary inking imagery from the local application window, such as by deleting or otherwise ceasing the presentation of the transient layer. In some examples, the transient layer may be maintained in cache for a duration, such as a set time or number of additional brush strokes, e.g., so that the user may undo or redo subsequent brush strokes while maintaining a visual of the preliminary inking imagery.

At remote client 606, remote inking platform 640 takes the inking parameters and brush parameters and generates finalized inking imagery, which is provided to remote renderer 642, as indicated at 1016. Remote inking platform 640 may generate the finalized inking imagery based on one or more intermediate inking imageries (e.g., generate wet, intermediate ink, then dry, finalized ink). In some examples, the intermediate inking imageries may be provided to local computing device for presentation within local application 610, such as to provide a more realistic inking platform for the user. In this example, only the finalized inking imagery parameters are sent from remote renderer 642 to GUI parameters 644, as indicated at 1018. At 1020, the finalized inking imagery parameters are provided from GUI parameters 644 to GUI sync 644, and then to GUI parameters 624, as indicated at 1022. With the finalized inking imagery parameters, the preliminary inking imagery may be removed from the local application window and replaced by finalized inking imagery.

In some embodiments, the methods and processes described herein may be tied to a computing system of one or more computing devices. In particular, such methods and processes may be implemented as a computer-application program or service, an application-programming interface (API), a library, and/or other computer-program product.

Figure 11:
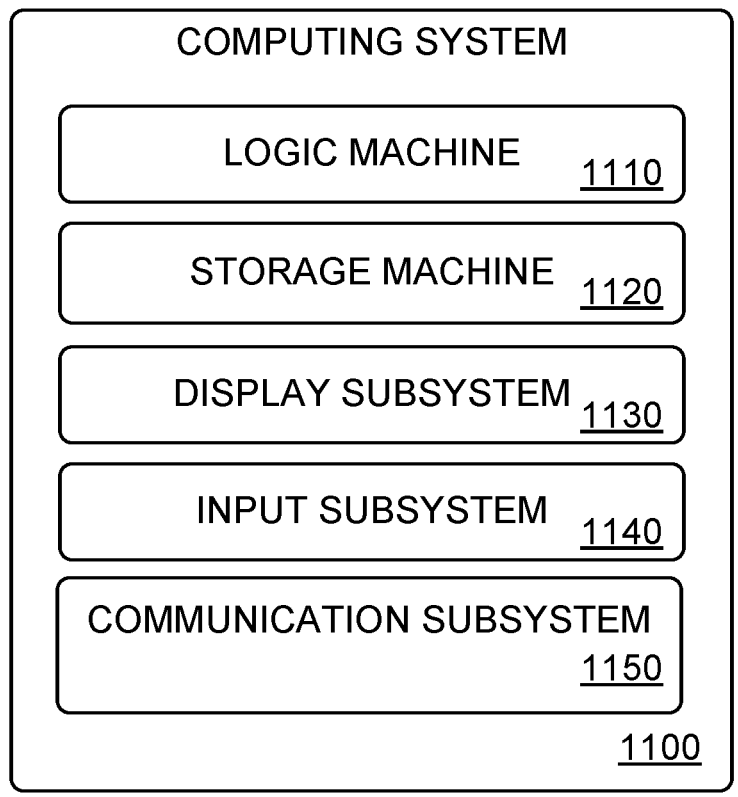
FIG. 11 schematically shows an example computing device.

FIG. 11 schematically shows a non-limiting embodiment of a computing system 1100 that can enact one or more of the methods and processes described above. Computing system 1100 is shown in simplified form. Computing system 1100 may take the form of one or more personal computers, server computers, tablet computers, home-entertainment computers, network computing devices, gaming devices, mobile computing devices, mobile communication devices (e.g., smart phone), and/or other computing devices.

Computing system 1100 includes a logic machine 1110 and a storage machine 1120. Computing system 1100 may optionally include a display subsystem 1130, input subsystem 1140, communication subsystem 1150, and/or other components not shown in FIG. 11. Computing devices 110, 200, 410, 604, and remote clients 102, 256, 402, and 606 may be examples of computing system 1100. Logic subsystem 202 may be an example of logic machine 1110. Storage subsystem 204 may be an example of storage machine 1120. Displays 112, 206, and 412 may be examples of display subsystem 1130. Input subsystem 208 may be an example of input subsystem 1140. Communication subsystem 210 may be an example of communication subsystem 1150.

Logic machine 1110 includes one or more physical devices configured to execute instructions. For example, the logic machine may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

The logic machine may include one or more processors configured to execute software instructions. Additionally or alternatively, the logic machine may include one or more hardware or firmware logic machines configured to execute hardware or firmware instructions. Processors of the logic machine may be single-core or multi-core, and the instructions executed thereon may be configured for sequential, parallel, and/or distributed processing. Individual components of the logic machine optionally may be distributed among two or more separate devices, which may be remotely located and/or configured for coordinated processing. Aspects of the logic machine may be virtualized and executed by remotely accessible, networked computing devices configured in a cloud-computing configuration.

Storage machine 1120 includes one or more physical devices configured to hold instructions executable by the logic machine to implement the methods and processes described herein. When such methods and processes are implemented, the state of storage machine 1120 may be transformed—e.g., to hold different data.

Storage machine 1120 may include removable and/or built-in devices. Storage machine 1120 may include optical memory (e.g., CD, DVD, HD-DVD, Blu-Ray Disc, etc.), semiconductor memory (e.g., RAM, EPROM, EEPROM, etc.), and/or magnetic memory (e.g., hard-disk drive, floppy-disk drive, tape drive, MRAM, etc.), among others. Storage machine 1120 may include volatile, nonvolatile, dynamic, static, read/write, read-only, random-access, sequential-access, location-addressable, file-addressable, and/or content-addressable devices.

It will be appreciated that storage machine 1120 includes one or more physical devices. However, aspects of the instructions described herein alternatively may be propagated by a communication medium (e.g., an electromagnetic signal, an optical signal, etc.) that is not held by a physical device for a finite duration.

Aspects of logic machine 1110 and storage machine 1120 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," and "engine" may be used to describe an aspect of computing system 1100 implemented to perform a particular function. In some cases, a module, program, or engine may be instantiated via logic machine 1110 executing instructions held by storage machine 1120. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

It will be appreciated that a "service", as used herein, is an application program executable across multiple user sessions. A service may be available to one or more system components, programs, and/or other services. In some implementations, a service may run on one or more server-computing devices.

When included, display subsystem 1130 may be used to present a visual representation of data held by storage machine 1120. This visual representation may take the form of a GUI. As the herein described methods and processes change the data held by the storage machine, and thus transform the state of the storage machine, the state of display subsystem 1130 may likewise be transformed to visually represent changes in the underlying data. Display subsystem 1130 may include one or more display devices utilizing virtually any type of technology. Such display devices may be combined with logic machine 1110 and/or storage machine 1120 in a shared enclosure, or such display devices may be peripheral display devices.

When included, input subsystem 1140 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity.

When included, communication subsystem 1150 may be configured to communicatively couple computing system 1100 with one or more other computing devices. Communication subsystem 1150 may include wired and/or wireless communication devices compatible with one or more different communication protocols. As non-limiting examples, the communication subsystem may be configured for communication via a wireless telephone network, or a wired or wireless local- or wide-area network. In some embodiments, the communication subsystem may allow computing system 1100 to send and/or receive messages to and/or from other devices via a network such as the Internet.

In one example, a method for rendering digital inking comprises receiving inking input at a local application window; locally processing the received inking input to generate preliminary inking imagery for presentation in the local application window; uploading parameters of the received inking input to a remote client for remote processing to generate finalized inking imagery; and updating the preliminary inking imagery based on the finalized inking imagery. The technical effects of implementing such a method include an increased user interaction performance, as immediate feedback is provided regardless of the latency incurred by uploading parameters and downloading finalized imagery. In such an example, or any other example, received inking input is additionally or alternatively locally processed based on a subset of brush parameters. In any of the preceding examples, or any other example, the subset of brush parameters is additionally or alternatively synchronized between the local application window and the remote client. In any of the preceding examples, or any other example, synchronizing the subset of brush parameters additionally or alternatively comprises downloading the brush parameters from the remote client. In any of the preceding examples, or any other example, the local application window is additionally or alternatively a local shell for a remotely hosted application. In any of the preceding examples, or any other example, the preliminary inking imagery is additionally or alternatively presented in a transient layer of the local application window. In any of the preceding examples, or any other example, updating the preliminary inking imagery based on the finalized inking imagery additionally or alternatively includes clearing contents of the transient layer from volatile memory. In any of the preceding examples, or any other example, updating the preliminary inking imagery based on the finalized inking imagery additionally or alternatively includes moving at least some of the contents of the transient layer to a finalized layer.

In another example, a method for rendering digital inking, comprises, responsive to launching a local application window that supports digital inking, initializing a connection to a remote client configured to generate finalized inking imagery; synchronizing active brush parameters between the local application window and the remote client; responsive to detecting an initiation of an inking input, presenting, in the local application window, preliminary inking imagery based on local processing of the active brush parameters and parameters of the inking input; uploading parameters of the inking input to the remote client; responsive to detecting a cessation of the inking input, downloading finalized inking imagery from the remote client, the finalized inking imagery based on the active brush parameters and the uploaded parameters of the inking input; removing the preliminary inking imagery from the local application window; and presenting the finalized inking imagery in the local application window. The technical effects of implementing such a method include reduced local processor load and memory requirements, as a wide array of brush parameters can be stored remotely, and inking processing can be performed remotely without sacrificing immediate, like-local feedback. In such an example, or any other example, synchronizing the active brush parameters is additionally or alternatively performed in response to detecting the initiation of inking input. In any of the preceding examples, or any other example, synchronizing the active brush parameters additionally or alternatively comprises downloading active brush parameters from the remote client. In any of the preceding examples, or any other example, the active brush parameters additionally or alternatively include parameters for digital inking with a virtual drawing element. In any of the preceding examples, or any other example, the active brush parameters additionally or alternatively include parameters for a virtual inking surface. In any of the preceding examples, or any other example, the local application window is additionally or alternatively a local shell for a remotely hosted application. In any of the preceding examples, or any other example, the preliminary inking imagery is additionally or alternatively presented in a transient layer of the local application window. In any of the preceding examples, or any other example, uploading parameters of the inking input to the remote client additionally or alternatively comprises uploading a bundle of parameters of the inking input bracketed by the initiation of the inking input and the cessation of the inking input.

In yet another example, a computing system, comprises an input subsystem; a display subsystem; a communication subsystem; and a storage machine holding instructions executable by a logic machine to, at the input subsystem, receive inking input at a local application window presented on the display subsystem; locally process the received inking input to generate preliminary inking imagery for presentation in the local application window; via the communication subsystem, upload parameters of the received inking input to a remote client for remote processing to generate finalized inking imagery; and update the preliminary inking imagery based on the finalized inking imagery. The technical effects of implementing such a computing system include an increased user interaction performance, as immediate feedback is provided regardless of the latency incurred by uploading parameters and downloading finalized imagery. In such an example, or any other example, the preliminary inking imagery is additionally or alternatively presented in a transient layer of the local application window. In any of the preceding examples, or any other example, the transient layer additionally or alternatively coincides with a footprint of the local application window. In any of the preceding examples, or any other example, the local application window is additionally or alternatively a local shell for a remotely hosted application.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A method for rendering digital inking, comprising:
receiving inking input at a local application window;
locally processing the received inking input to generate preliminary inking imagery for presentation in the local application window;
uploading parameters of the received inking input to a remote client for remote processing to generate finalized inking imagery; and
updating the preliminary inking imagery based on the finalized inking imagery.

2. The method of claim 1, wherein received inking input is locally processed based on a subset of brush parameters.

3. The method of claim 2, wherein the subset of brush parameters is synchronized between the local application window and the remote client.

4. The method of claim 3, wherein synchronizing the subset of brush parameters comprises downloading the brush parameters from the remote client.

5. The method of claim 1, wherein the local application window is a local shell for a remotely hosted application.

6. The method of claim 1, wherein the preliminary inking imagery is presented in a transient layer of the local application window.

7. The method of claim 6, wherein updating the preliminary inking imagery based on the finalized inking imagery includes clearing contents of the transient layer from volatile memory.

8. The method of claim 6, wherein updating the preliminary inking imagery based on the finalized inking imagery includes moving at least some of the contents of the transient layer to a finalized layer.

9. A method for rendering digital inking, comprising:
responsive to launching a local application window that supports digital inking, initializing a connection to a remote client configured to generate finalized inking imagery;
synchronizing active brush parameters between the local application window and the remote client;
responsive to detecting an initiation of an inking input, presenting, in the local application window, preliminary inking imagery based on local processing of the active brush parameters and parameters of the inking input;
uploading parameters of the inking input to the remote client;
responsive to detecting a cessation of the inking input, downloading finalized inking imagery from the remote client, the finalized inking imagery based on the active brush parameters and the uploaded parameters of the inking input;
removing the preliminary inking imagery from the local application window; and
presenting the finalized inking imagery in the local application window.

10. The method of claim 9, wherein synchronizing the active brush parameters is performed in response to detecting the initiation of inking input.

11. The method of claim 9, wherein synchronizing the active brush parameters comprises downloading active brush parameters from the remote client.

12. The method of claim 9, wherein the active brush parameters include parameters for digital inking with a virtual drawing element.

13. The method of claim 9, wherein the active brush parameters include parameters for a virtual inking surface.

14. The method of claim 9, wherein the local application window is a local shell for a remotely hosted application.

15. The method of claim 9, wherein the preliminary inking imagery is presented in a transient layer of the local application window.

16. The method of claim 9, wherein uploading parameters of the inking input to the remote client comprises uploading a bundle of parameters of the inking input bracketed by the initiation of the inking input and the cessation of the inking input.

17. A computing system, comprising:
   an input subsystem;
   a display subsystem;
   a communication subsystem; and
   a storage machine holding instructions executable by a logic machine to at the input subsystem, receive inking input at a local application window presented on the display subsystem;
   locally process the received inking input to generate preliminary inking imagery for presentation in the local application window;
   via the communication subsystem, upload parameters of the received inking input to a remote client for remote processing to generate finalized inking imagery; and
   update the preliminary inking imagery based on the finalized inking imagery.

18. The computing system of claim 17, wherein the preliminary inking imagery is presented in a transient layer of the local application window.

19. The computing system of claim 18, wherein the transient layer coincides with a footprint of the local application window.

20. The computing system of claim 19, wherein the local application window is a local shell for a remotely hosted application.

* * * * *